Jan. 13, 1959 C. H. J. VAN HERPT 2,868,591
APPARATUS FOR CONTINUOUSLY FEEDING A MOIST, FINELY
DIVIDED SOLID MATERIAL INTO A STREAM OF GAS
Filed July 11, 1957
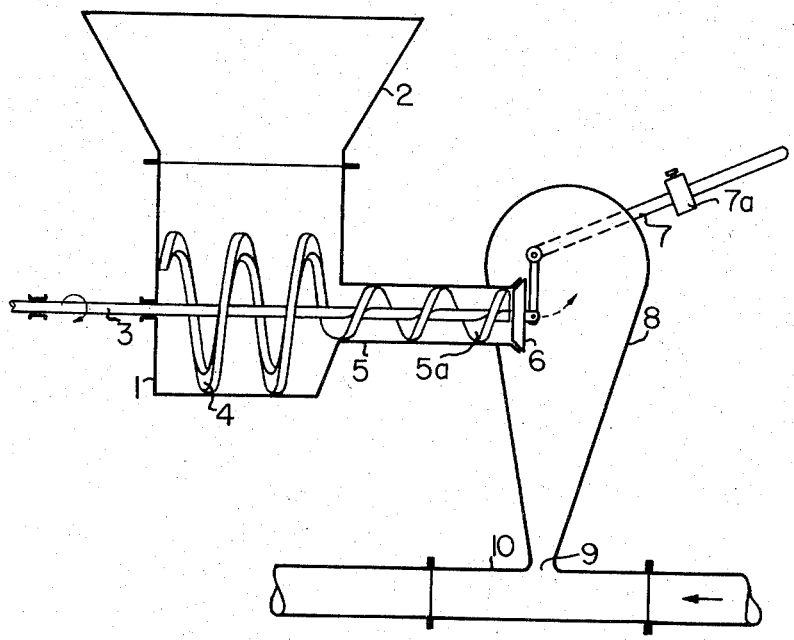
Inventor
Cornelius H. J. Van Herpt
By Cushman, Darby & Cushman
Attorneys

United States Patent Office 2,868,591
Patented Jan. 13, 1959

2,868,591

APPARATUS FOR CONTINUOUSLY FEEDING A MOIST, FINELY DIVIDED SOLID MATERIAL INTO A STREAM OF GAS

Cornelis H. J. Van Herpt, Geleen, Netherlands, assignor to Stamicarbon N. V., Heerlen, Netherlands Application July 11, 1957, Serial No. 671,334

Claims priority, application Netherlands July 11, 1956

1 Claim. (Cl. 302—50)

This invention relates to apparatus for continuously feeding a moist, finely divided solid material into a stream of gas, e. g., for the purpose of transporting the solid in the gas.

It is known in the pneumatic transportation of finely divided dry material to employ a pump comprising a screw conveyor which conveys the solid at the required rate by way of a valve into a chamber into which the carrier air is injected to aerate the material which is propelled forward and entrained by the combined forces of the screw and the air expansion in the chamber (see e. g., Taggart—Handbook of Mineral Dressing, 5th ed., section 18, page 54).

This pump has proved unsuitable for dispensing moist finely divided material into a pipe through which a stream of gas is forced; the moist material is not regularly transported by the screw conveyor and once discharged past the valve tends to adhere to the wall of the air chamber forming an obstruction.

The present invention provides apparatus which is better adapted for feeding moist finely divided solid material e. g., moist sand, cola phosphate or adipic acid, into a stream of gas, e. g., a stream of hot drying air at more than atmospheric pressure.

The apparatus according to the invention for continuously feeding a moist, finely divided solid material into a stream of gas, comprises a feed compartment adapted to be kept charged with the solid material by gravity feed from a hopper or other device, a cylindrical passage leading from the said compartment and housing a screw conveyor for feeding material from the said compartment and along the said passage, a ribbon conveyor in the feed compartment and leading up to the screw conveyor, a valve at the discharge end of the said conveyor passage adapted to be opened by the pressure of material fed along the passage, and a chamber forming a discharge chute, in which material passing the valve will fall and which tapers to a bottom outlet connected or adapted to be connected into a pipe for conducting a gas stream.

Preferably the said feed compartment has a capacity considerably larger than the screw conveyor passage, the ribbon conveyor being of a larger diameter than the screw conveyor, and preferably the ribbon and screw conveyors are mounted on a common shaft for drive from a common source.

The invention will be further described with reference to the accompanying drawing which diagrammatically illustrates in vertical section, a preferred embodiment of the invention.

The device comprises a trough 1 forming a feed compartment, disposed below a hopper 2. Mounted on a shaft 3 is a ribbon conveyor 4 which leads up to and is an extension of a screw conveyor 5a housed in a cylindrical passage 5. The discharge end of the passage 5 is closed by a valve 6 which is retained in closed position by means of a lever 7 loaded by a weight 7a and is adapted to be opened by the pressure of material fed along the passage. The screw conveyor discharges into a chamber 8, which chamber forms a discharge chute, connected by way of outlet 9 into a pipe 10 for conducting a gas stream.

The chamber 8 is of inverted drop shape in vertical section. With such a rounded shape of chamber, dead spaces are avoided. Moreover, the outlet 9 is small, so that the formation of powerful air eddies in the chamber is hindered, due to the small area of contact between the gas stream and the said chamber outlet.

In use moist, finely divided solid material, such, e. g., as adipic acid crystals containing 10% moisture, is fed into the hopper 2 and gravitates into the trough 1 where it is maintained in a fluffy condition and is kept moving towards the screw conveyor 5a by the ribbon conveyor 4. In this way material feeding from the hopper 2 is prevented from arching and an uninterrupted feed of material to and along the passage 5 is ensured. On reaching a sufficiently high pressure the material feeding along the passage will lift the valve 6 and continuously feed into the chamber 8 and fall to the outlet 9. There will consequently be a regular and continuous delivery of the solid material into the pipe 10, where the material will be carried along by a gas stream, such e. g., as a current of hot drying air.

In apparatus according to the invention, in order to prevent the propulsion of material in the feed compartment from becoming excessive, the ribbon conveyor may be formed in two or more sections, but I find it preferable to ensure that there is at least one or two complete convolutions of the ribbon directly joined to the screw conveyor. In all cases I prefer to keep the outlet from the discharge chamber within a size range corresponding to 10–40 mm. diameter.

I claim:

In an apparatus for continuously feeding a moist, finely divided solid material into a stream of gas: a hopper for a supply of moist, finely divided solid material, a feed compartment in communication with said hopper and adapted to be kept charged with the material from said hopper by a gravity feed, a cylindrical passage leading from said feed compartment, a ribbon conveyor in said feed compartment and in substantial alignment with said cylindrical passage, a screw conveyor in said cylindrical passage, said ribbon conveyor having a larger diameter than said screw conveyor and forming an extension of said screw conveyor, said ribbon conveyor and said screw conveyor being mounted on a common drive shaft, a valve at the discharge end of said cylindrical passage, said valve being operable by pressure of material fed along said passage, and a chamber forming a discharging chute at the discharge end of said cylindrical passage, said chamber being of an inverted drop shape in vertical section, said chamber having an outlet at its lower end connected to a pipe for conducting the stream of gas.

References Cited in the file of this patent

UNITED STATES PATENTS

| | | |
|---|---|---|
| 1,959,864 | Hartley | May 22, 1934 |
| 2,299,470 | Davis | Oct. 20, 1942 |
| 2,689,674 | Goldberg | Sept. 21, 1954 |